(12) United States Patent
Joseph et al.

(10) Patent No.: US 9,953,064 B2
(45) Date of Patent: Apr. 24, 2018

(54) KEYWORD ASSESSMENT

(71) Applicant: Marketo, Inc., San Mateo, CA (US)

(72) Inventors: Anthony Joseph, Bellevue, WA (US); Adam Goldblatt, Mercer Island, WA (US)

(73) Assignee: Marketo, Inc., San Mateo, CA (US)

( * ) Notice: Subject to any disclaimer, the term of this patent is extended or adjusted under 35 U.S.C. 154(b) by 0 days.

(21) Appl. No.: 14/705,848

(22) Filed: May 6, 2015

(65) Prior Publication Data

US 2015/0234835 A1     Aug. 20, 2015

Related U.S. Application Data

(63) Continuation of application No. 13/267,626, filed on Oct. 6, 2011, now Pat. No. 9,037,594.

(51) Int. Cl.
    *G06F 17/30*      (2006.01)
    *G06F 17/00*      (2006.01)

(52) U.S. Cl.
CPC .... *G06F 17/3053* (2013.01); *G06F 17/30867* (2013.01)

(58) Field of Classification Search
CPC ........... G06Q 30/0269; G06Q 30/0207; G06Q 40/10; G06Q 50/01; G06Q 30/0245; G06Q 30/0251; G06Q 30/0255; G06Q 30/06; G06Q 10/00; G06Q 30/0631; G06Q 20/12; G06Q 30/02; G06Q 20/36; G06Q 99/00; G06Q 30/00; G06Q 30/0625; G06Q 10/02; G06Q 10/10
See application file for complete search history.

(56) References Cited

U.S. PATENT DOCUMENTS

| | | | | |
|---|---|---|---|---|
| 8,200,205 | B2 * | 6/2012 | Ramer | G06F 17/30905 455/418 |
| 8,903,816 | B2 * | 12/2014 | Dumon | G06F 17/30979 707/706 |
| 2005/0149396 | A1 * | 7/2005 | Horowitz et al. | 705/14 |
| 2011/0238495 | A1 * | 9/2011 | Kang | G06Q 30/02 705/14.49 |

* cited by examiner

*Primary Examiner* — Yicun Wu
(74) *Attorney, Agent, or Firm* — Mahamedi IP Law LLP

(57) ABSTRACT

Methods, systems, and techniques for keyword management are described. Some embodiments provide a keyword management system ("KMS") configured to determine the effectiveness of multiple candidate keywords. In some embodiments, the KMS generates multiple candidate keywords based on an initial keyword. The KMS may then determine an effectiveness score for each of the candidate keywords, based on marketing information about those keywords. Next, the KMS may process the candidate keywords according to the determined effectiveness scores. In some embodiments, processing the candidate keywords includes applying rules that conditionally perform actions with respect to the candidate keywords, such as modifying advertising expenditures, modifying content, or the like.

8 Claims, 10 Drawing Sheets

| | Keyword | Data Provider ID | Attribute Name | Attribute Value | Date |
|---|---|---|---|---|---|
| 301a | rock climbing | 1001 | visits | 5300 | 2011-04-11 |
| 301b | rock climbing | 1003 | searches | 550,000 | 2011-04-11 |
| 301c | rock climbing | 1003 | cost per click | $0.95 | 2011-04-11 |
| 301d | rock climbing | 1002 | rank | 5 | 2011-04-11 |
| 301e | rock climbing | 1005 | searches | 250,000 | 2011-04-11 |
| 301f | rock climbing | 1005 | cost per click | $0.75 | 2011-04-11 |
| 301g | climbing gear | 1001 | visits | 1200 | 2011-04-11 |
| 301h | climbing gear | 1003 | searches | 65,000 | 2011-04-11 |
| 301i | climbing gear | 1003 | cost per click | $1.50 | 2011-04-11 |
| 301j | climbing gear | 1002 | rank | 25 | 2011-04-11 |
| 301k | climbing gear | 1005 | searches | 37,000 | 2011-04-11 |
| 301l | climbing gear | 1005 | cost per click | $1.25 | 2011-04-11 |
| 301m | ... | | | | |
| 301n | rock climbing | 1001 | visits | 4900 | 2011-04-04 |
| 301o | rock climbing | 1003 | searches | 525,000 | 2011-04-04 |
| 301p | ... | | | | |

*Fig. 3A*

| | Attribute Name | Data Provider ID | Weight | Date |
|---|---|---|---|---|
| 311a | visits | 1001 | .2 | 11-Apr-2011 |
| 311b | searches | 1003 | .15 | 11-Apr-2011 |
| 311c | cost per click | 1003 | .05 | 11-Apr-2011 |
| 311d | searches | 1005 | .2 | 11-Apr-2011 |
| 311e | cost per click | 1005 | .1 | 11-Apr-2011 |
| 311f | rank | 1002 | .3 | 11-Apr-2011 |
| 311g | ... | | | |
| 311h | visits | 1001 | .2 | 4-Apr-2011 |
| 311i | searches | 1003 | .2 | 4-Apr-2011 |
| 311j | ... | | | |

Fig. 3B

| | Keyword | Score | Date |
|---|---|---|---|
| 321a | rock climbing | .381 | 2011-04-11 |
| 321b | climbing gear | .142 | 2011-04-11 |
| 321c | rock climbing gear | .101 | 2011-04-11 |
| 321d | mountaineering | .073 | 2011-04-11 |
| 321e | ... | | |
| 321f | rock climbing | .185 | 2011-04-04 |
| 321g | climbing gear | .255 | 2011-04-04 |
| 321h | ... | | |

KEYWORD ASSESSMENT

CLAIM OF PRIORITY

This application is a continuation application under 35 U.S.C. 120 of prior U.S. application Ser. No. 13/267,626, filed on Oct. 6, 2011, the disclosure of which is incorporated herein by reference in its entirety for all purposes.

BACKGROUND

1. Field of the Invention

The present disclosure relates to methods, techniques, and systems for managing and assessing keywords and, more particularly, to methods, techniques, and systems for determining the effectiveness of multiple candidate keywords and processing the candidate keywords according to their determined effectiveness.

2. Description of the Related Art

Keywords play an important role in online marketing and advertising efforts. In particular, keywords are one mechanism by which a marketer can drive visitors to a Web site. In some online advertising models, a keyword can be "purchased," for example, from a search engine provider/vendor, such that an advertisement will be served or otherwise provided in response to a search for that keyword. Thus, an advertiser interested in marketing a particular brand of car may purchase the keyword "car," such that an advertisement for that car will be presented to a user who makes a search that includes the keyword "car." In a contextual advertising model (e.g., Google AdSense), an advertisement may be presented based on the context of a Web page or other content item accessed by a user. Thus, continuing the above example, an advertisement for a car may be presented to a user who visits a Web page (e.g., a blog) having content directed to cars.

Unfortunately, there currently appear to be no efficient or effective methodologies for understanding the effectiveness of keywords. In some situations, metrics and other keyword-related information can be obtained, such as how many searches are performed with a particular keyword, how many presentations of an advertisement result in an action (e.g., a click through), or the like. However, such metrics alone do not provide sufficient guidance to facilitate effective keyword acquisition and allocation strategies.

SUMMARY

A computer-implemented method for managing keywords is disclosed. The method includes receiving a keyword. The method includes generating multiple candidate keywords based on the received keyword. The candidate keywords include synonyms of the received keyword. The method includes receiving, for each of multiple attributes, attribute values for each of the candidate keywords. The method includes receiving weights associated with each of the multiple attributes. The method includes determining scores for each of the candidate keywords based on the received attribute values and the received weights. The method includes processing the candidate keywords based on their scores.

A computer-readable medium including contents that enable a computing system to manage keywords, by performing a method, is disclosed. The method includes receiving, for each of multiple attributes, attribute values for each of multiple candidate keywords. The method includes receiving weights associated with each of the multiple attributes. The method includes determining scores for each of the candidate keywords based on the received attribute values and the received weights. The method includes processing, according to a specified rule, the candidate keywords based on their scores.

A computing system configured to manage keywords is disclosed. The computing system includes a memory. The computing system includes a module that is stored on the memory and that is configured, when executed, to: receive from multiple distinct sources, for each of multiple attributes, attribute values for each of multiple candidate keywords; receive weights associated with each of the multiple attributes; determine scores for each of the candidate keywords based on the received attribute values and the received weights; and process, according to a specified rule, the candidate keywords based on their scores.

BRIEF DESCRIPTION OF THE DRAWINGS

FIGS. 3A-3F illustrate example data and screen displays processed, utilized, or generated by an example embodiment of a keyword management system.

DETAILED DESCRIPTION

Embodiments described herein provide enhanced computer- and network-based methods and systems for managing keywords and, more particularly, for assessing the effectiveness of multiple candidate keywords. Example embodiments provide a keyword management system ("KMS") configured to assess keywords and possibly take one or more actions with respect to one or more of the assessed keywords. In some embodiments, the keyword management system is configured to receive an initial (e.g., original or "seed") keyword and to determine multiple candidate keywords based on the initial keyword. The candidate keywords include keywords that are in some way related or similar to the initial keyword, such as synonyms, variations, etymological derivations, and the like. The keyword management system then determines, for each of the initial and candidate keywords, an effectiveness score based on marketing information. The marketing information may be received from various sources (e.g., advertising services, analytics services, search services) and may include traffic information (e.g., how many visits to a Web site), search information (e.g., how many searches include the keyword), advertising information (e.g., cost-per-click for the keyword), or the like. Then, based on the determined effectiveness score, the keyword management system takes some action, such as recommending one of the candidate keywords as being more effective than the initial keyword, reallocating advertising resources with respect to one or more keywords, modifying content, or the like.

Figure 1:
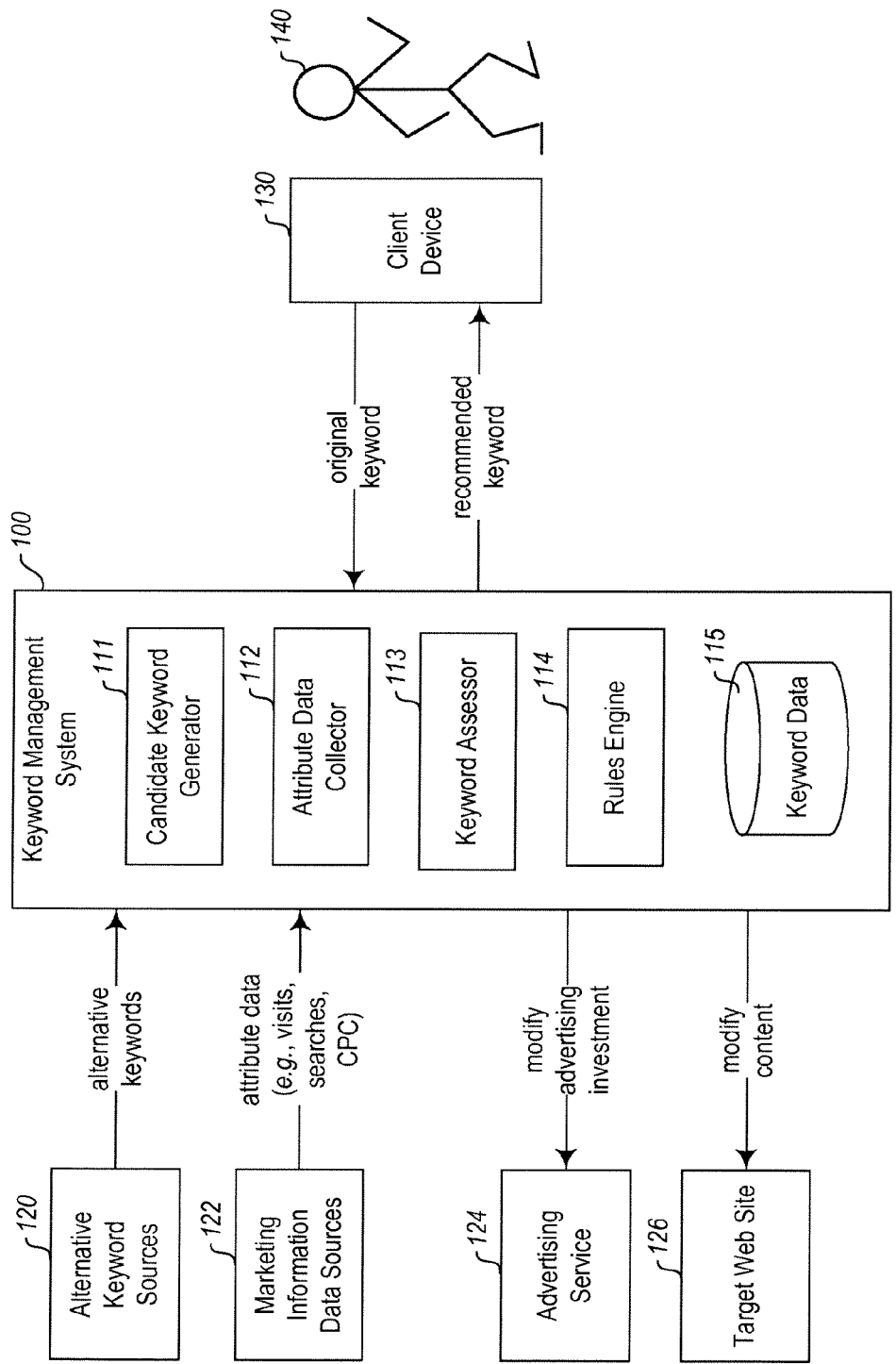
FIG. 1 illustrates an example block diagram of an example embodiment of a keyword management system.

FIG. 1 illustrates an example block diagram of an example embodiment of a keyword management system. In particular, FIG. 1 illustrates a keyword management system ("KMS") 100. The keyword management system 100 includes a candidate keyword generator 111, an attribute data collector 112, a keyword assessor 113, a rules engine 114, and a keyword data repository 115. The keyword management system 110 interacts with one or more of alternative keyword sources 120, marketing information data sources 122, an advertising service 124, a target Web site 126, and a client device 130 operated by a user 140 in order to perform at least some of the functions described herein.

In a typical usage scenario, the keyword management system 100 facilitates or supports a marketing campaign for a product or service that is offered via the target Web site 126. For example, the target Web site 126 may be or include an online store that deals in outdoor sporting goods, such as might be used for hiking, camping, fishing, rock climbing, mountaineering, or the like. The user 140 utilizes the keyword management system 100 to manage a collection of keywords that are used for advertising purposes. Keywords can be used for advertising purposes in various ways. For example, the user 140 may purchase sponsored search results (e.g., a link or other result that is presented in exchange for a fee and in response to a search query that includes a keyword) from a search service. As another example, the user 140 may pay for contextual advertisements for a keyword, such as a link or other control that is presented within the context of a Web page (e.g., a blog, a news item, a social networking profile) or application (e.g., a mobile application) based on the occurrence of the keyword on the Web page or related to the application. The keyword management system 100 provides the user 140 with information that can be used to make decisions regarding the allocation of resources (e.g., budget) between various keywords and/or advertising services. In some embodiments, these decisions can be automated within the keyword management system 100, so as to cause the dynamic allocation of resources based on changes in keyword marketing information and other factors over time.

In one embodiment, the keyword management system 100 receives an indication of an original keyword from the client device 130. The candidate keyword generator 111 then generates candidate keywords that are based on or related to the original keyword. Generating candidate keywords may including obtaining alternative keywords based on the received original keyword from one or more alternative keyword sources 120. The alternative keyword sources 120 include any sources configured to provide keywords, information about keywords, or information that can be used by the candidate keyword generator 111 to determine information about keywords or keywords themselves. Such sources may include those that provide keywords based on syntax, semantics, definitions, synonyms, etymology, orthography, phonic qualities, slang interpretations, euphemisms, or the like. Such sources may include commercial or noncommercial network-accessible databases, such as on online dictionaries, thesauri, encyclopedias, or the like. The candidate keyword generator 111 may then process the received alternative keywords, such as by selecting those that are appropriate or otherwise suitable with respect to a marketing campaign for or related to the target Web site 126. The selected keywords are then stored as candidate keywords in the keyword data repository 115.

The attribute data collector 112 obtains attribute data from one or more marketing information data sources 122. Attribute data may include data values for, or corresponding to, one or more marketing information attributes related to a keyword. Example attributes include the number of searches that include a particular keyword, the number of visits to a Web page or Web site, the rank of a particular keyword, the cost per click associated with a particular keyword, or the like. Data values corresponding to such attributes may be obtained from multiple distinct sources. For example, the number of visits to a Web page may be obtained from a Web site that hosts the page or from an analytics service that tracks accesses to the page. In addition, the number of searches that include a particular keyword may be obtained from multiple distinct search services. As a further example, cost per click information may be obtained from an advertising service. The attribute data collector 112 collects data from diverse sources, aggregates the collected data, and stores it in the keyword data repository 115.

The keyword assessor 113 assesses the candidate keywords to determine their relative effectiveness. In one embodiment, assessing the candidate keywords includes determining a score for each of the candidate keywords (and an initial keyword that was used to generate the candidate keywords) that is based on the attribute data collected by the attribute data collector 112 and/or stored in the keyword data repository 115. In one embodiment, the keyword assessor 113 determines a score by computing a weighted sum of multiple of the (possibly normalized) attribute data values. The attribute data values may be weighted in different ways and for various reasons. In one embodiment, data values may be weighted to reflect their importance or significance relative to other data values. For example, if the number of searches that include a particular keyword is considered to be more important than the number of site visits, the number of searches may be given a higher weight than the number of site visits. In another embodiment, data values may be weighted based on the source of the data values, such as to reflect a bias or unreliability associated with a particular source. For example, if data received from a particular source is suspected or known to be unreliable (e.g., out of date, inaccurate), such data may be given a lower weight with respect to similar data received from other sources. In addition, in some embodiments the weightings may be tuned, such as at determined times or even dynamically based upon statistical modeling techniques. The keyword assessor 113 stores the assessments of candidate keywords in the keyword data repository 115, such as by storing computed scores for each of the candidate keywords.

The rules engine 114 is configured to perform or initiate actions with respect to the candidate keywords, based on scores or other assessment data associated with those keywords. In one embodiment, actions taken by the rules engine 114 are based at least in part on rules (e.g., criteria, conditional commands, directives, scripts) received, for example, from the user 140 via the client device 130. Example rules specify one or more conditions and actions to be taken when those conditions are (or are not) met. One example rule may cause the keyword management system 100 to recommend the highest scoring keyword to the user 140. The user 140 can then make a decision with respect to the recommended keyword, such as reallocating a marketing budget or the like. Another example rule may cause the keyword management system 100 to make (or increase) an advertising purchase for the highest scoring keyword, such as by purchasing a sponsored placement associated with the keyword on a search engine. Another example rule may allocate a fixed advertising budget (e.g., $1000) over a plurality of highest scoring keywords in a particular ratio (e.g., 50% to the highest keyword, 30% to the second highest keyword, and 20% to the third highest keyword).

In some embodiments, the rules engine 114 also or instead causes the modification of content on target Web site 126. For example, in response to an assessment that identifies a new highest scoring keyword, the rules engine 114 may cause Web pages or other content hosted on the target Web site 126 to include the new keyword, such as by including the new keyword in a meta-information field, searching and replacing a previously used keyword with the new keyword, modifying a heading or title element to include the new keyword, or the like. Such actions may be performed automatically, manually, or in some combination. For example, the rules engine 114 (or some other component) may automatically perform a search and replace on copies of one or more Web pages of site 126, but not publish or otherwise make available the modified pages until they are editorially reviewed by a human user.

Although the techniques are described primarily in the context of Web-based marketing, they may be equally applied in other contexts as well. For example, the techniques are not limited to HTML or other text-based sources of information, and may be used to identify effective keywords in non-textual sources, such as audio files, video files, image files, or the like. Also, the techniques may be used to identify effective keywords in a non-marketing context, such as a corpus of academic papers, technical documentation, or the like.

Furthermore, the described techniques are not limited to the specific architecture shown in FIG. 1. In some embodiments, some aspects of keyword management may be performed by another (possibly external or remote) system or component. For example, the storage of keyword data may be performed by an external system, such as a cloud-based storage system. Also, in some embodiments, the keyword management system 100 may not interact directly with users as shown, but rather provide user interface components (e.g., keyword management widgets, plug-ins) that may be embedded or otherwise incorporated in third-party applications or systems, such as Web sites, smart phones, desktop systems, and the like.

Also, although certain terms are used primarily herein, other terms could be used interchangeably to yield equivalent embodiments and examples. For example, the terms "keyword" and "keyterm" may be used interchangeably. In addition, the term "keyword" includes a string of one or more distinct words or terms. Thus, the string "rock climbing" may be considered a single "keyword." In addition, terms may have alternate spellings which may or may not be explicitly mentioned, and all such variations of terms are intended to be included.

Figure 2:
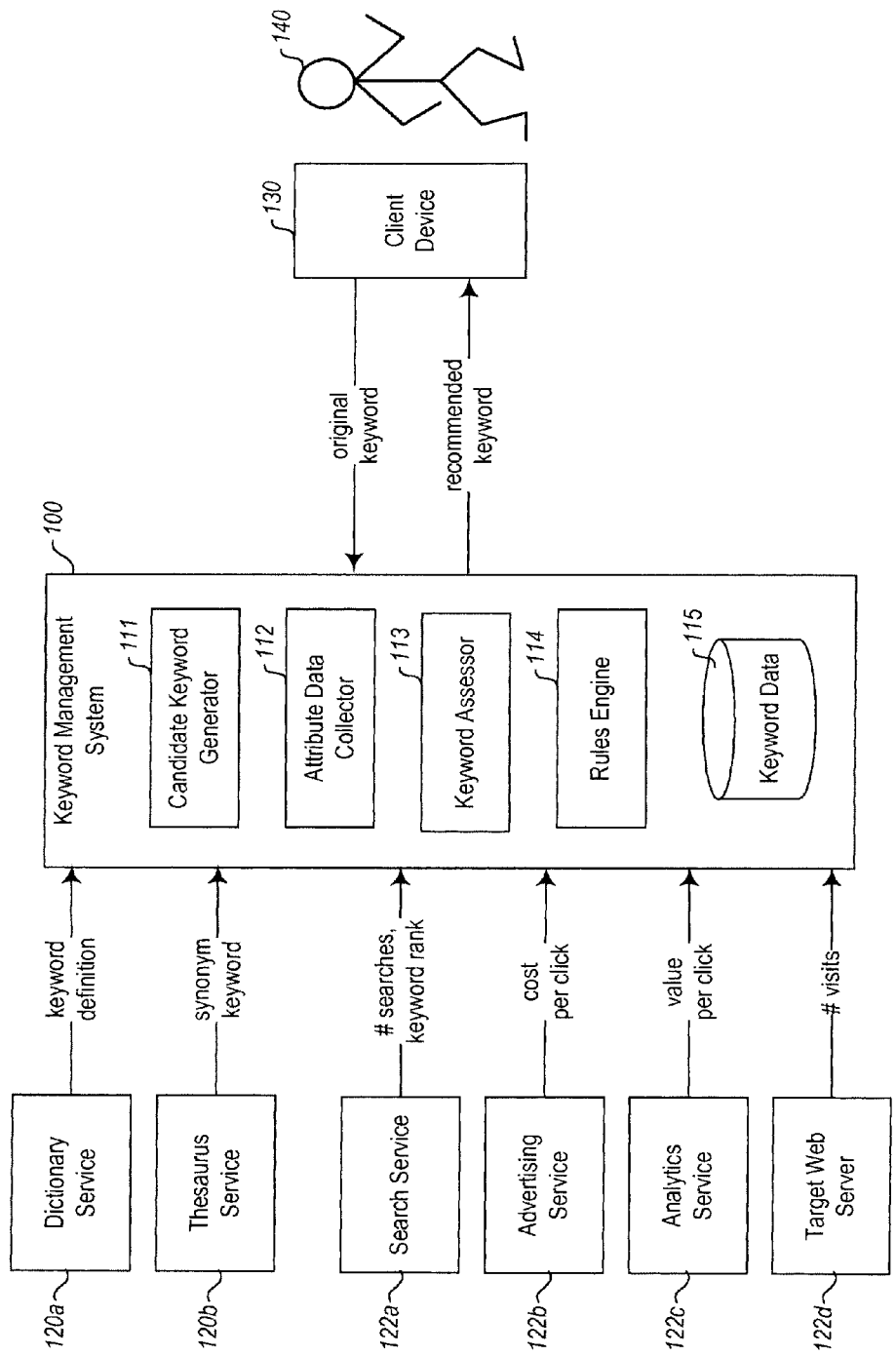
FIG. 2 depicts information sources used by an example embodiment of a keyword management system.

FIG. 2 depicts information sources used by an example embodiment of a keyword management system. In particular, FIG. 2 illustrates the keyword management system 100 interacting with example alternative keyword sources, including a dictionary service 120a and a thesaurus service 120b, and marketing information sources, including a search service 122a, an advertising service 122b, an analytics service 122c, and a target Web server 122d.

In the example of FIG. 2, the keyword management system 100 obtains information related to alternative keywords from the dictionary service 120a and the thesaurus service 120b. More particularly, the candidate keyword generator 111 receives information related to alternative keywords from each of the elements 120a-120b and stores the received information in the keyword data repository 115.

The dictionary service 120a may be a system that hosts an online dictionary or other definition lookup service. In this example, the dictionary service 120a provides to the candidate keyword generator 111, in response to a received keyword, a definition for that keyword. The candidate keyword generator 111 then uses the received definition to generate additional keywords related to the original keyword, and stores those additional keywords in the keyword data repository 115. The candidate keyword generator 111 may analyze the received definition to identify potential alternative keywords. For example, given a definition for "rock climbing" that includes "mountain climbing on rocky cliffs," the keyword generator 111 may identify "mountain climbing" as an alternative keyword. As another example, a received definition may include or identify plural or alternative forms a particular term, which may then be stored in the keyword data repository 115 as candidate keywords.

The thesaurus service 120b may be a system that hosts an online thesaurus. In this example, the thesaurus service 120b provides to the candidate keyword generator 111, in response to a received keyword, one or more synonyms for that keyword. The candidate keyword generator 111 then stores received synonyms as candidate keywords in the keyword data repository 115.

As noted, other types of alternative keyword sources are contemplated, including those that do not directly provide alternative keywords, but rather provide intermediate information that is processed by the candidate keyword generator 111 to determine alternative keywords. For example, the candidate keyword generator 111 may collect or harvest text from Web pages to determine co-occurrences between keywords, and then use the determined co-occurrences to generate alternative keywords with respect to an original keyword. Also, natural language processing techniques may be used to syntactically and/or semantically process information received from alternative keyword sources.

Also in the example of FIG. 2, the keyword management system 100 obtains marketing information from the search service 122a, the advertising service 122b, the analytics service 122c, and the target Web server 122d. More particularly, the attribute data collector 112 receives marketing information from each of the elements 122a-122d and stores the received information in the keyword data repository 115.

The search service 122a may be a system that hosts a search engine that identifies Web pages and other content items that are relevant to received search queries that include one or more keywords. The search service 122a may track search activity, and provide to the attribute data collector 112 statistical information about searches performed via the search service 122a. For example, the search service 122a may provide, for a given keyword, a total number of searches performed for queries that include that keyword. As another example, the search service 122a may provide, for a given keyword, the rank of that keyword as compared to other keywords, where the rank may be based on the total number of searches performed for queries that include that keyword.

The advertising service 122b may be a system that facilitates Web-based advertising, such as the placement of banner ads or "sponsored" search results. The advertising service 122b may place advertisements associated with a particular keyword in exchange for a fee. In the illustrated example, the advertising service 122b provides to the attribute data collector 112 statistical information about its services, including a cost-per-click (e.g., bid-based, flat-rate, or other) associated with a given keyword. Other types of statistical information are contemplated, including that relevant for different advertising models, such as pay-per-impression, paid placements, or the like. Note that the advertising service 122b may be at least in part integrated with the search service 122a.

The analytics service 122c may be a system that tracks and/or analyzes online marketing efforts or activities, and provides advice, guidance, or statistical information based on such analysis. For example, the analytics service 122c may provide higher-order information about online marketing activities, such as total number of unique visitors (as opposed to total number of page accesses), lead conversion information, tracking information, and the like. In this example, the analytics service 122c provides to the attribute data collector 112 a value per click associated with a given keyword. The value per click reflects the cost per click (possibly paid to multiple distinct advertising services 112b) as well as the revenue generated by those clicks (possibly based on multiple distinct revenue streams).

The target Web server 122d may be or include a system that offers a product or service that is the subject of a marketing campaign managed by the user 140. In this example, the target Web server 122d collects marketing information such as traffic and visitor information, including total number of visits, total number of sales, total number of leads, lead conversions, and the like. The target Web server 122d provides this collected information to the attribute data collector 112, which in turn stores it in the keyword data repository 115. In some embodiments, this information may be provided indirectly to the attribute data collector 112, such as via the analytics service 122c.

Figure 3D:
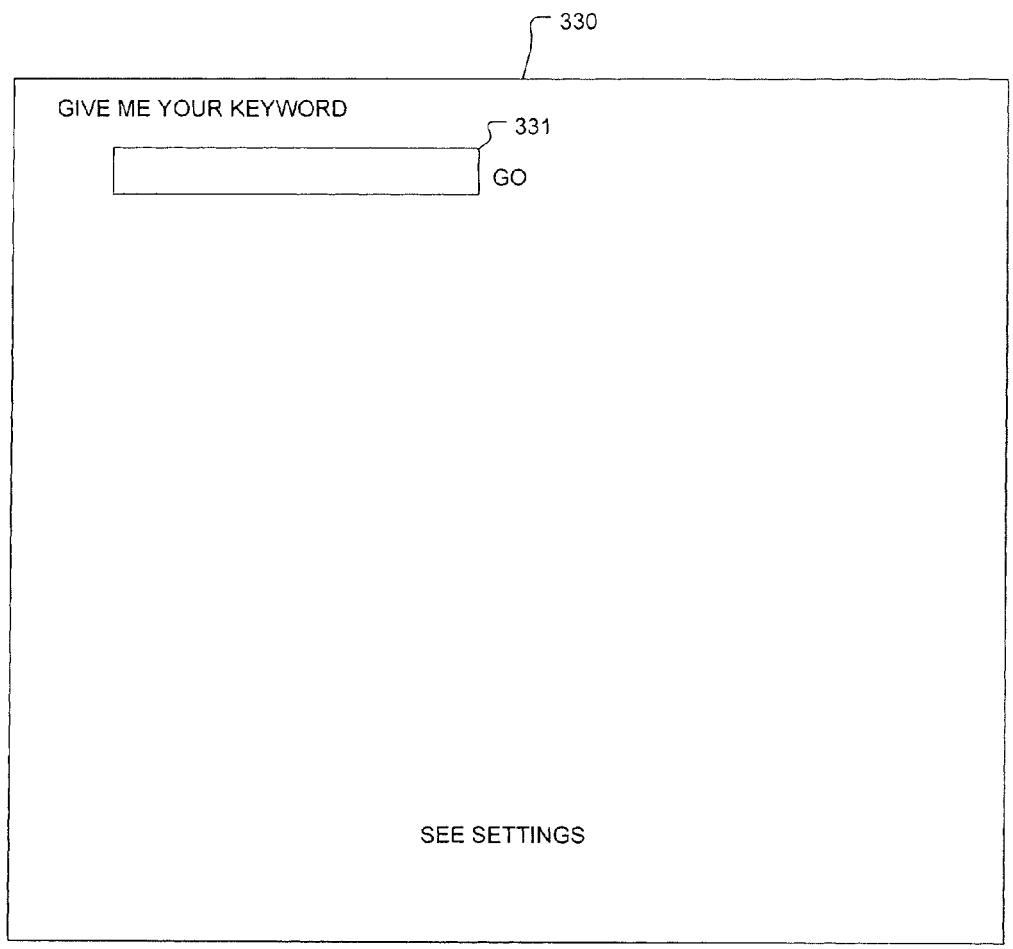
Figure 3E:
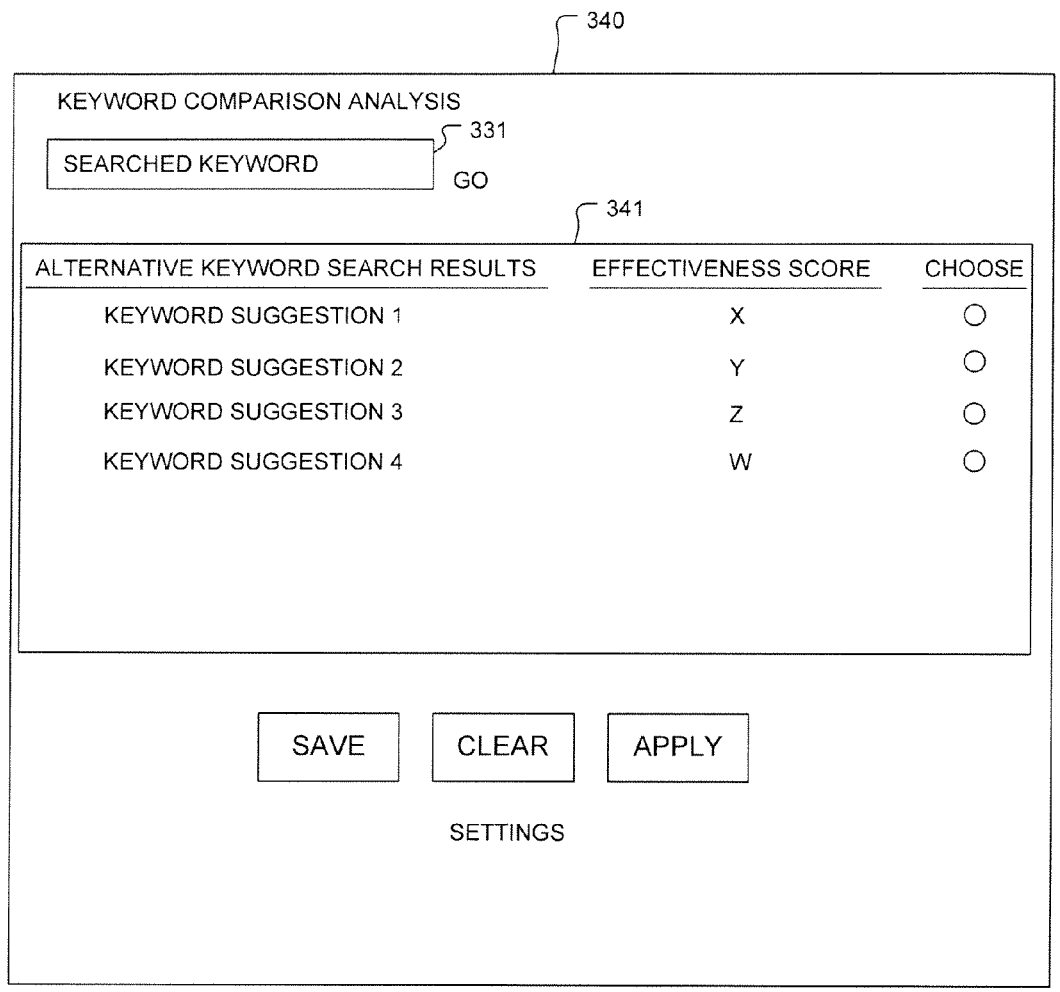

FIGS. 3A-3F illustrate example data and screen displays processed, utilized, or generated by an example embodiment of a keyword management system. More particularly, FIGS. 3A-3C present a running example that illustrates, in FIG. 3A, candidate keywords and attribute data received for those keywords, in FIG. 3B, weights associated with various keyword attributes, and in FIG. 3C, effectiveness scores determined for each of the candidate keywords. FIGS. 3D-3E depict example screen displays provided by an example embodiment.

FIG. 3A depicts a data structure used by an example embodiment to represent attribute information about keywords. In particular, FIG. 3A depicts a table 300 comprising rows 301a-301p that each represent attribute information about a particular keyword, including a keyword 302a, a data provider identifier ("ID") 302b, an attribute name 302c, an attribute value 302d, and a date 302e. A greater or lesser number of rows or fields may be represented in other embodiments.

The keyword management system uses table 300 to associate, for each keyword, multiple attributes and corresponding attribute values. An attribute may be any kind, type, or category of information associated with a keyword. In particular, in table 300, each row associates a keyword 302a with an attribute name 302c and a corresponding attribute value 302d. For example, row 301a associates the keyword "rock climbing" with an attribute named "visits" and a corresponding attribute value of 5300, representing the fact that the keyword "rock climbing" resulted in 5300 visits during some time period. A visit may be, for example, a Web page access reported by the target Web server 122d (FIG. 2). Other attributes are shown in the table, including "searches" in row 301b (e.g., a number of searches made via a particular search service 122a), "cost per click" in row 301c (e.g., a payment per action to a particular advertising service 122b), "rank" in row 301d (e.g., a keyword rank from 1 to 100 compared to other keywords based on number of searches), and the like.

The keyword management system also tracks the source of data that is represented in table 300. In so doing, the keyword management system is in some embodiments configured to base keyword effectiveness not just on keyword attribute values, but also on the source of those attribute values, thereby accounting or correcting for unreliability, bias, or other sources of inaccuracy associated with particular data sources. In table 300, each row includes a data provider ID 302b, which allows the table 300 to represent attribute values 302d for common attribute names 302c that have been obtained from distinct sources. In the illustrated example, both of rows 301b and 301e include information for an attribute named "searches," reflecting a number of searches for the keyword "rock climbing" performed during some time period. Rows 301b and 301e have data provider IDs 1003 and 1005, respectively, reflecting that the information in those rows has been obtained from (or is relevant) to different entities. For example, the information in row 301b may have been obtained from a first search service (e.g., Google search), while the information in row 301e may have been obtained from a second search service (e.g., Bing search).

The keyword management system also records historical attribute values in table 300. In so doing, the keyword management system can determine keyword effectiveness over time and in response to changes made to keyword usage and resource allocation (e.g., increased or decreased budgets). In particular, in table 300, each row includes a date 302e, which allows the table 300 to represent attribute values 302d obtained from common data providers at different times. In the illustrated example, both of rows 301a and 301n include attribute data values for the "visits" attribute for a keyword named "rock climbing," obtained from data provider ID 1001 on different dates (Apr. 11, 2011 and Apr. 4, 2011, respectively). Rows 301a and 301n thus indicate an increase in 400 visits over the illustrated time period. Similarly, rows 301b and 301o include attribute data values for the "searches" attribute for the keyword "rock climbing," obtained from data provider ID 1003 on different dates (Apr. 11, 2011 and Apr. 4, 2011).

FIG. 3B depicts a data structure used by an example embodiment to represent weights associated with particular keyword attributes. In particular, FIG. 3B depicts a table 310 comprising rows 311a-311j, each representing a weighting information associated with a particular keyword attribute and data provider, including an attribute name 312a, a data provider identifier ("ID") 312b, a weight 312c, and a date 312d. A greater or lesser number of rows or fields may be represented in other embodiments.

As discussed with reference to FIG. 3A, the keyword management system associates stored information with its source, so that it can consider that source when making determinations regarding keyword effectiveness. Thus, as shown in rows 311b and 311d, weights of 0.15 and 0.2 are respectively assigned to values for the "searches" attribute obtained from data providers 1003 and 1005. Similarly, as shown in rows 311c and 311e, weights of 0.05 and 0.1 are respectively assigned to values for the "cost per click" attribute obtained from data providers 1003 and 1005. These different weights may reflect a judgment (made automatically by the keyword management system or obtained from a human intelligence) about the relative reliability, accuracy, or bias of data providers 1003 and 1005.

FIG. 3C depicts a data structure used by an example embodiment to represent keyword effectiveness scores determined for particular keywords. In particular, FIG. 3C depicts a table 320 comprising rows 321a-321h, each representing scoring information associated with a keyword, including keyword 322a, a score 322b, and a date 322c. A greater or lesser number of rows or fields may be represented in other embodiments.

The keyword management system may determine keyword effectiveness scores based on the data in tables 300 and 310, and store the resulting scores in table 310. In one embodiment, the keyword management system automatically determines an effectiveness score for a given keyword as the sum of each (possibly normalized) attribute value represented in table 300 (selected for a given time period) multiplied by a weight corresponding to the attribute and its associated data provider as represented in table 310. For example, a keyword effectiveness score, S, may be computed as follows:

$$S = \sum_{attribute} \sum_{provider} norm(value_{attribute, provider}) * weight_{attribute, provider} \quad (1)$$

In equation (1), above, each attribute value from a particular provider is normalized and multiplied by a corresponding weight. The normalization function may depend on the particular attribute, provider, or the like. For example, the number of visits may be normalized based on the total number of visits, computed as the sum of all visits for a particular time period. For example, if the target Web site received 20000 visits during the week of Apr. 11, 2011 the 5300 visits represented by row 301a would be divided by 20000. As another example, the number of searches for a keyword may be normalized based on a total number of searches for that keyword across multiple data providers. Here, rows 301b and 301e respectively indicate 550,000 and 250,000 searches, resulting in a total of 800,000. Thus, the number of searches in rows 301b and 301e would be normalized by dividing those values by 800,000. As a further example, the rank may be normalized by subtracting rank divided by 100 from 1. Since in this example rank is a measure between 1 and 100, each rank would be normalized to a number between 0.99 and 0, with a rank of one resulting in a normalized rank of 0.99 and a rank of 100 resulting in a normalized rank of 0. Also, cost per click may be normalized by computing its additive inverse (e.g., subtracting from zero, computing the negative) to reflect a negative impact of cost per click on a resulting keyword effectiveness score. Using the above normalizations as an example, an effectiveness score can be computed for the current example as shown in equation (2), below:

$$S = \left(\frac{visits_{1001}}{20000} * weight_{visits,1001}\right) + \left(\frac{searches_{1003}}{80000} * weight_{searches,1003}\right) + \quad (2)$$
$$(-CPC_{1003} * weight_{CPC,1003}) + \left(\frac{searches_{1005}}{80000} * weight_{searches,1005}\right) +$$
$$(-CPC_{1005} * weight_{CPC,1005}) + \left(\left(1 - \frac{rank_{1002}}{100}\right) * weight_{rank,1002}\right)$$

Substituting values for the weights and the attributes yields equation (3):

$$S = \left(\frac{5300}{20000} * .2\right) + \left(\frac{550000}{800000} * .15\right) + (-.95 * .05) + \quad (3)$$
$$\left(\frac{250000}{800000} * .2\right) + (-.75 * .1) + \left(\left(1 - \frac{5}{100}\right) * .3\right) \approx 0.381$$

Thus, in this example, the keyword effectiveness score for the keyword "rock climbing" is about 0.381 and this value is shown stored in row 321a. Using the above data, shown in rows 301g-301l together with corresponding weights in rows 311a-311f, a keyword effectiveness score for the keyword "climbing gear" is about 0.142. This effectiveness score is shown stored in row 321b. Rows 321c and 321d store effectiveness scores for other candidate keywords, "rock climbing gear" and "mountaineering." As can be seen from the example, "rock climbing" has the highest effectiveness score.

The keyword management system stores historical keyword effectiveness scores by associating a date 322c with each determined score. Thus, the keyword management system can compare the effectiveness of the keyword "rock climbing" on Apr. 11, 2011 with its effectiveness on Apr. 4, 2011. Such a comparison indicates that, in this example, the effectiveness has increased from 0.185 to 0.381. Effectiveness may change over time based on various factors, including an increased marketing budget (e.g., paying more for advertisements, running more advertisements, increasing the price paid per click), changes to organic search rankings (e.g., because the content of the target Web site changed, because more other sites linked to the target Web site), cultural factors (e.g., an increase in popularity of particular activities), or the like.

As noted above, some embodiments can be configured to automatically take specified actions in response to certain conditions being met (or not met). For example, in this example, a rule may be configured to cause an administrative user to be notified (e.g., via an email or text message) under certain conditions, such as when a keyword has been identified that has higher effectiveness score than a previously used keyword. As another example, a rule may be configured to cause an advertising purchase or reallocation to be made with respect to one or more keywords, based at least in part on the effectiveness scores of those keywords (e.g., split a specified amount of advertising budget equally or in a pro-rata manner over the keywords having the three highest effectiveness scores).

FIGS. 3D-3E depict example screen displays provided by an example embodiment of a keyword management system. The illustrated screen displays may be user interface screens as part of a client application, such as within the context of a Web browser, as part of a standalone executable, or the like. The client application may execute on the client device 130 and access functions of the keyword management system 100, described with respect to FIG. 1.

FIG. 3D illustrates a user interface screen 330. The screen 330 includes a keyword input control 331. The keyword input control 331 in this example is a text input field with a corresponding activation button (labeled "GO") that together may be used by a user to provide an initial keyword for assessment to the keyword management system 100

FIG. 3E illustrates a user interface screen 340. The screen 340 presents information and controls related to candidate keywords generated in response to an initial keyword received by the keyword management system. In one embodiment, the screen 340 may be provided in response to entry of an initial keyword as described with respect to FIG. 3D. The screen 340 includes the keyword control 331 and a candidate keyword information table 341. The table 341 lists four candidate keywords (here identified as "Keyword Suggestion" 1-4), each having a corresponding effectiveness score (here identified as X, Y, Z, and W) and a selection button (here depicted as a radio button in the "Choose" column). A user may activate one of the selection buttons to select its corresponding keyword for future use and/or for some other action (e.g., to obtain additional information).

Figure 3F:
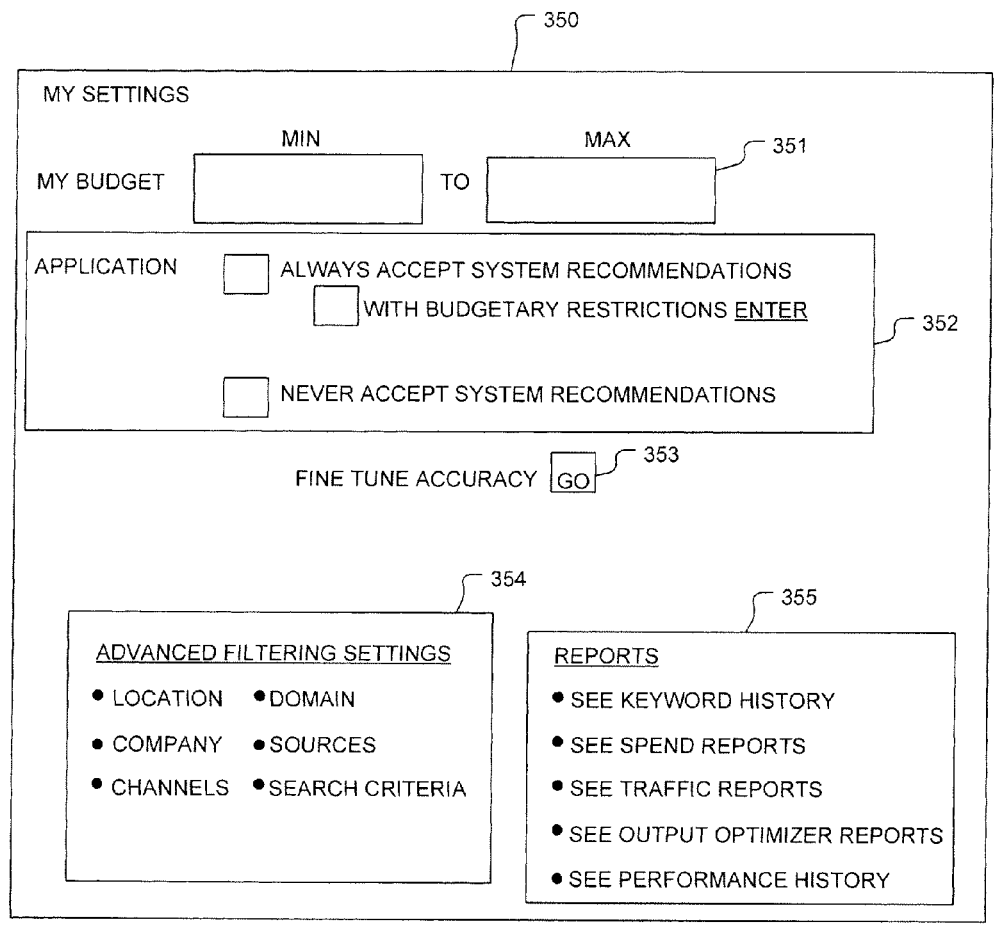

FIG. 3F illustrates a user interface screen 350. The screen 350 presents information and controls related to a user's settings or configuration of the keyword management system. The screen 350 includes a budget input control 351, a keyword selection rule control 352, an accuracy control 353, filtering settings area 354, and reports access area 355. The budget input control 351 includes a minimum and maximum budget field, which can be used by the user to specify a minimum and/or maximum amount to spend (during a period, such as a week or month). The selection rule control 352 includes controls that can be used by the user to direct the keyword management system to take various actions with respect to assessed/recommended keywords, such as to always accept a recommendation; always accept recommendations within specified budgetary constraints; and/or never accept recommendations and instead notify the user of the recommendations so that the user can manually make changes if he so chooses. The accuracy control 353 can be used by the user to modify parameters, weights, or other aspects of a keyword assessment formula/process, such as the one described with respect to FIGS. 3A-3C, above. The filtering settings area 354 includes controls (e.g., links or buttons) that can be activated by the user to access filtering settings that can be used to further modify the process of keyword assessment, such as by specifying locations, domains, companies, sources, channels, search criteria, and/or other sources for alternative keywords, attribute data, and/or other information used by the keyword management system. The reports access area 355 includes controls (e.g., links or buttons) that can be activated by the user to obtain a variety of reports, including keyword history (e.g., previously used keywords), spending reports, traffic reports, and the like.

Figure 4:
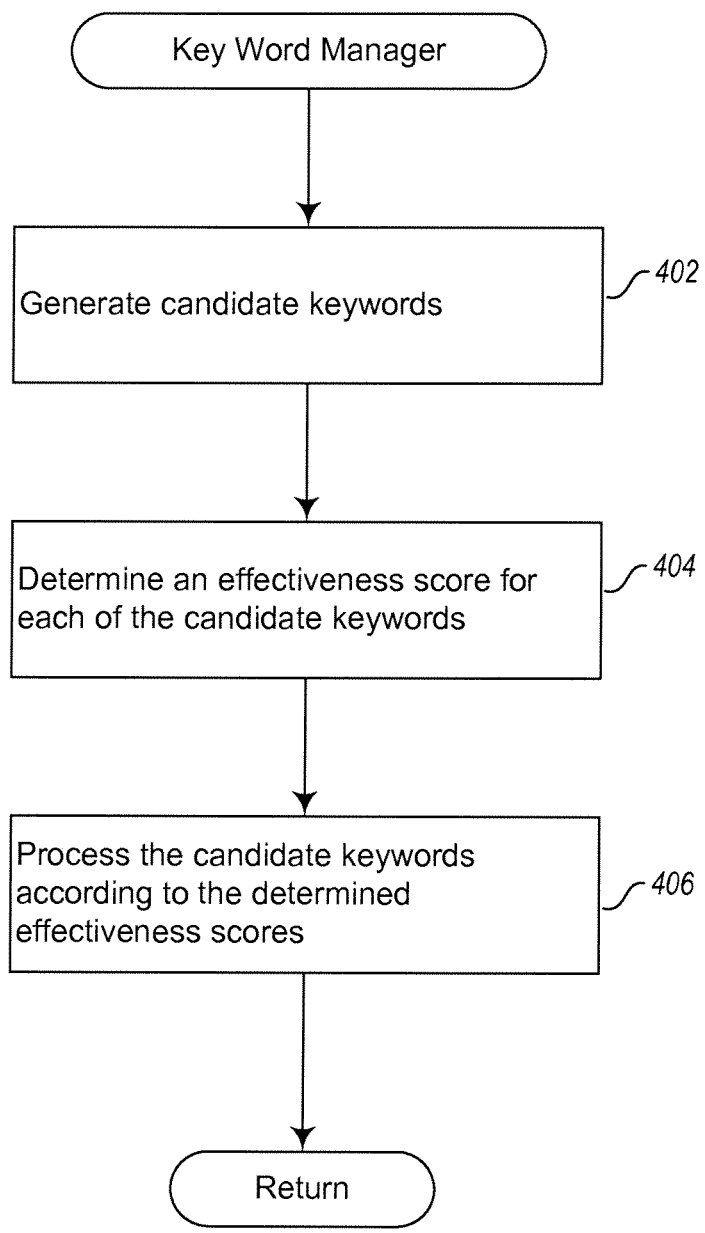
FIG. 4 is an example flow diagram of a keyword management process performed by an example embodiment.

FIG. 4 is an example flow diagram of a keyword management process performed by an example embodiment of a keyword management system. The illustrated process may be provided by one or more components of the keyword management system 100 described with respect to FIG. 1. The illustrated process generates and assesses candidate keywords, and then processes them based on the performed assessment.

The process begins at block 402, where it generates candidate keywords. In one embodiment, the process receives an initial keyword, such as a keyword that is currently in use with respect to a marketing campaign. The process then generates candidate keywords that are related or similar to the initial keyword, such as by referencing dictionaries, thesauruses, Web sites that also use the initial keyword, or the like. In some embodiments, candidate keywords may be generated at least in part by harvesting keywords from one or more Web pages or other content items. For example, a user may provide the process with one or more URLs or other identifiers that indicate content items (e.g., Web pages that are associated with the user or possibly a competitor). The process may then process the indicated content items to identify keywords, such as by identifying frequently used terms, terms used in titles, or the like.

At block 404, the process determines an effectiveness score for each of the candidate keywords. In the illustrated embodiment, the set of candidate keywords used in block 404 also includes the initial keyword that was used in block 402 to generate candidate keywords. Determining an effectiveness score for each of the candidate keywords may include receiving marketing information related to the candidate keywords. Such information may be represented by data values that may be organized by attributes or into categories. Determining an effectiveness score may then further include aggregating the data values, such as by normalizing, summing, averaging, or other operations. In some embodiments, the data values may be weighted to reflect importance, confidence, reliability, or other qualities that may impact keyword effectiveness. The determined effectiveness scores may then be stored for historical reference or for use by other components/modules.

At block 406, the process processes the candidate keywords according to the determined effectiveness scores. In one embodiment, processing the candidate keywords includes applying, interpreting, or otherwise evaluating one or more rules with respect to the candidate keywords. A rule may specify a condition (e.g., a criterion) and an action to be performed if the condition is met (e.g., evaluates to true). Such rules may be specified or otherwise received from a user, such as via a rules user interface configured to allow the user to select criteria and corresponding actions. Note that not all embodiments will utilize a rules-based approach. For example, processing the candidate keywords according to the determined effectiveness scores may include preparing a report that includes the candidate keywords ordered based on their corresponding effectiveness scores.

Some embodiments perform one or more operations/aspects in addition to, or instead of, the ones described with reference to the process of FIG. 4. For example, in one embodiment, after block 406, the process may return to block 402 to generate, assess, and process additional keywords. As another example, some embodiments may not perform block 402, and instead rely on previously generated candidate keywords (e.g., from a previous run) or candidate keywords obtained from a third-party source.

Figure 5:
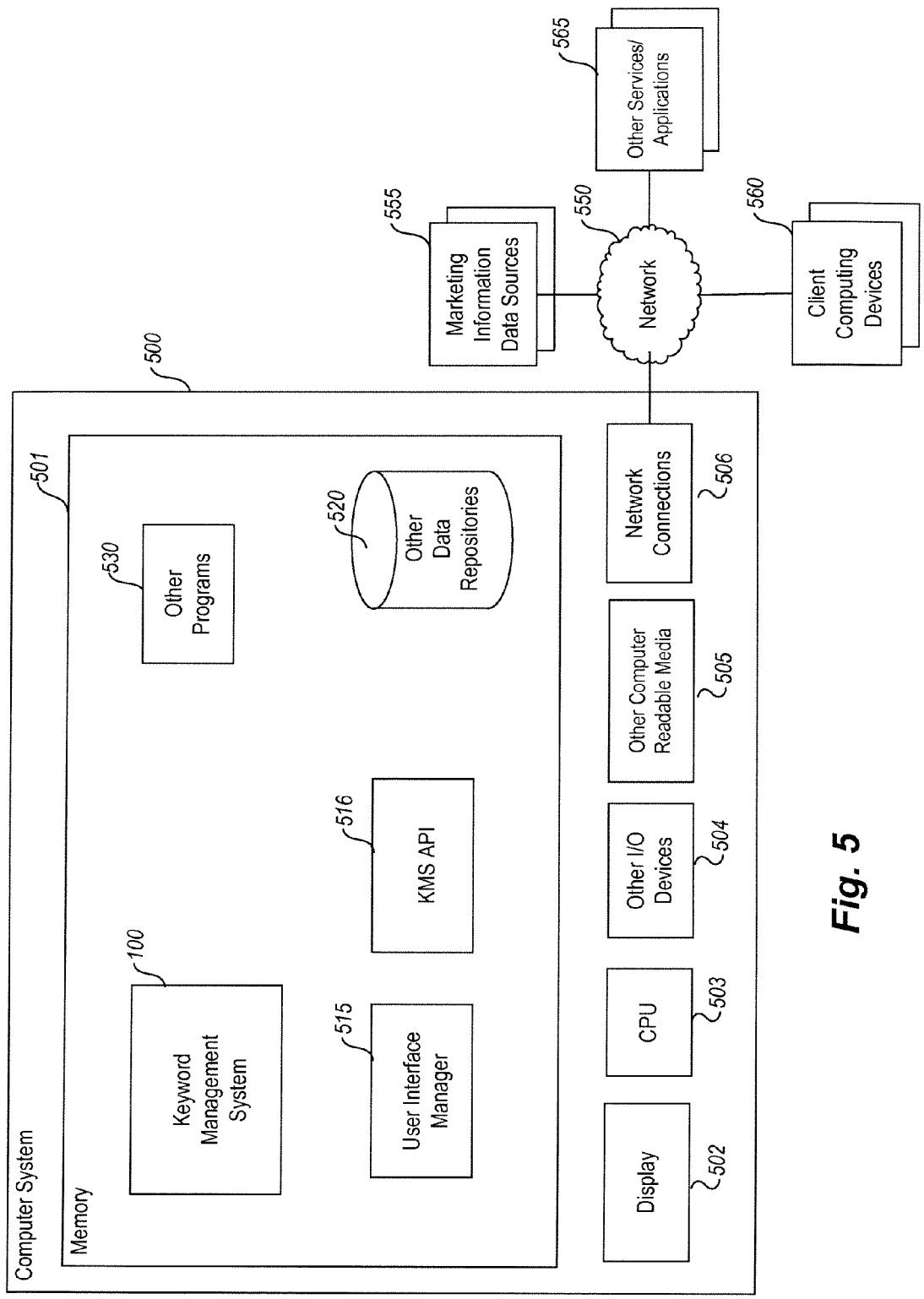
FIG. 5 is an example block diagram of an example computing system for implementing a keyword management system according to an example embodiment.

FIG. 5 is an example block diagram of an example computing system for implementing a keyword management system according to an example embodiment. In particular, FIG. 5 shows a computing system 500 that may be utilized to implement a keyword management system 100, as described with reference to FIG. 1.

Note that one or more general purpose or special purpose computing systems/devices may be used to implement the keyword management system 100. In addition, the computing system 500 may comprise one or more distinct computing systems/devices and may span distributed locations. Furthermore, each block shown may represent one or more such blocks as appropriate to a specific embodiment or may be combined with other blocks. Also, the keyword management system 100 may be implemented in software, hardware, firmware, or in some combination to achieve the capabilities described herein.

In the embodiment shown, computing system 500 comprises a computer memory ("memory") 501, a display 502, one or more Central Processing Units ("CPU") 503, Input/Output devices 504 (e.g., keyboard, mouse, CRT or LCD display, and the like), other computer-readable media 505, and network connections 506. The keyword management system 100 is shown residing in memory 501. In other embodiments, some portion of the contents, some or all of the components of the keyword management system 100 may be stored on and/or transmitted over the other computer-readable media 505. The components of the keyword management system 100 preferably execute on one or more CPUs 503 and manage keywords, as described herein. Other code or programs 530 (e.g., an administrative interface, a Web server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer readable media 505 or a display 502.

The keyword management system 100 interacts via the network 550 with marketing information data sources 555, other services/applications 565, and client computing devices 560. The network 550 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The client computing devices 560 include desktop computers, notebook computers, mobile phones, smart phones, personal digital assistants, tablet computers, and the like. The other services/applications 565 may include, for example, one or more of the alternative keyword sources 120, the advertising service 124, the target Web site 126, or any other system that provides information or services (e.g., remote storage) to the keyword management system 100.

The keyword management system 100 resides in the memory 501 with a user interface ("UI") manager 515 and a keyword management system application program interface ("KMS API") 516. The UI manager 515 provides a view and a controller that facilitate user interaction with the keyword management system 100 and its various components. For example, the UI manager 515 may provide interactive access to the keyword management system 100, such that users can specify keywords, obtain assessment information regarding keywords, specify rules, or the like. In some embodiments, access to the functionality of the UI manager 515 may be provided via a Web server, possibly executing as one of the other programs 530. In such embodiments, a user operating a Web browser executing on one of the client devices 560 can interact with the keyword management system 100 via the UI manager 515. For example, a user may manually specify (e.g., in a text field of a Web form) an initial keyword used for the generation and assessment of candidate keywords.

The API 516 provides programmatic access to one or more functions of the keyword management system 100. For example, the API 516 may provide a programmatic interface to one or more functions of the keyword management system 100 that may be invoked by one of the other programs 530 or some other module. In this manner, the API 516 facilitates the development of third-party software, such as user interfaces, plug-ins, news feeds, adapters (e.g., for integrating functions of the keyword management system 100 into Web applications), and the like.

In addition, the API 516 may be in at least some embodiments invoked or otherwise accessed via remote entities, such as code executing on one of the client devices 560, to access various functions of the keyword management system 100. For example, one of the marketing information data sources 555 may push marketing information to the keyword management system 100 via the API 516. The API 516 may also be configured to provide widgets (e.g., code modules) that can be integrated into the third-party applications 565 and that are configured to interact with the keyword management system 100 to make at least some of the described functionality available within the context of other applications.

In an example embodiment, components/modules of the keyword management system 100 are implemented using standard programming techniques. For example, the keyword management system 100 may be implemented as a "native" executable running on the CPU 503, along with one or more static or dynamic libraries. In other embodiments, the keyword management system 100 may be implemented as instructions processed by a virtual machine that executes as one of the other programs 530. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the keyword management system 100, such as in the data store 517, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 517 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the keyword management system 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and/or data structures may be stored as non-transitory content on one or more tangible computer-readable mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for keyword assessment are applicable to other architectures. For example, keyword assessments can be tailored to specific contexts or devices, such as assessing keywords for use in the mobile device (e.g., smart phone) context. Also, the methods, techniques, and systems discussed herein are applicable to differing query languages, protocols, communication media (optical, wireless, cable, etc.) and devices (e.g., desktop computers wireless handsets, electronic organizers, personal digital assistants, portable email machines, game machines, pagers, navigation devices such as GPS receivers, etc.).

What is claimed is:

1. A method for operating an online keyword management system, the method being implemented by one or more processors of a server and comprising:
   receiving, at the server over a network, one or more original keywords from a client device;
   generating, by the server, candidate keywords related to the one or more original keywords;
   obtaining attribute data, from one or more marketing information database systems over the network, for the candidate keywords, the attribute data including data values for one or more marketing attributes related to the candidate keywords, wherein the one or more marketing information database systems record a source who provided each of the data values, and an identifier for the source is included in the attribute data obtained from the one or more marketing information database systems;
   receiving, from the client device, selection of one or more filters for application to the attribute data, the one or more filters including one or more specifications of location, domain, company, source, channel, and search criteria;
   applying, by the server, the one or more filters to the attribute data to generate filtered attribute data;
   processing, by the server, the filtered attribute data to assess an effectiveness score for driving traffic to a website for each of the candidate keywords, wherein assessing the effectiveness score for each of the candidate keywords includes modifying at least some of the data values in the filtered attribute data with a weight associated with the source who provided that data value; and
   modifying a web page to include at least one of the candidate keywords based on a comparison of the effectiveness scores for each of the candidate keywords.

2. The method of claim 1, further comprising:
   selecting a best keyword from the listing of one or more recommended keywords based on a comparison of the effectiveness scores of the candidate keywords.

3. The method of claim 1 wherein generating the candidate keywords includes generating a candidate according to at least one of: etymology, orthography, phonic qualities, synonyms, slang interpretations, and/or euphemisms associated with the original keyword.

4. The method of claim 1 wherein the attribute data includes at least one of: an amount of site traffic for each keyword, an amount of competitor site traffic for each keyword, a keyword volume, a keyword ranking, a cost per click associated with each keyword, a value for click associated with each keyword, a category alignment for each keyword, and/or an identifier of data provider/source.

5. An online keyword management system, comprising:
   one or more processors; and
   one or more memory resources storing instructions that, when executed by the one or more processors, cause the online keyword management system to:
   receive one or more original keywords from a client device over a network;
   generate candidate keywords related to the one or more original keywords;
   obtain attribute data from one or more marketing information database systems for the candidate keywords, the attribute data including data values for one or more marketing attributes related to the candidate keywords, wherein the one or more marketing information database systems record a source who provided each of the data values, and an identifier for the source is included in the attribute data obtained from the one or more marketing information database systems;
   receive from the client device selection of one or more filters for application to the attribute data, the one or more filters including one or more specifications of location, domain, company, source, channel, and search criteria;
   apply the one or more filters to the attribute data to generate filtered attribute data;
   process the filtered attribute data to assess an effectiveness score for driving traffic to a website for each of the candidate keywords, wherein assessing the effectiveness score for each of the candidate keywords includes modifying at least some of the data values in the filtered attribute data with a weight associated with the source who provided that data value; and
   modify a web page to include at least one of the candidate keywords based on a comparison of the effectiveness scores for each of the candidate keywords.

6. The online keyword management system of claim 5, including further instructions to:
   select a best keyword from the listing of one or more recommended keywords based on a comparison of the effectiveness scores of the candidate keywords.

7. The online keyword management system of claim 5 wherein generating the candidate keywords includes generating a candidate according to at least one of: etymology, orthography, phonic qualities, synonyms, slang interpretations, and/or euphemisms associated with the original keyword.

8. The online keyword management system of claim 5 wherein the attribute data includes at least one of: an amount of site traffic for each keyword, an amount of competitor site traffic for each keyword, a keyword volume, a keyword ranking, a cost per click associated with each keyword, a value for click associated with each keyword, a category alignment for each keyword, and/or an identifier of data provider/source.

* * * * *